Patented Jan. 30, 1951

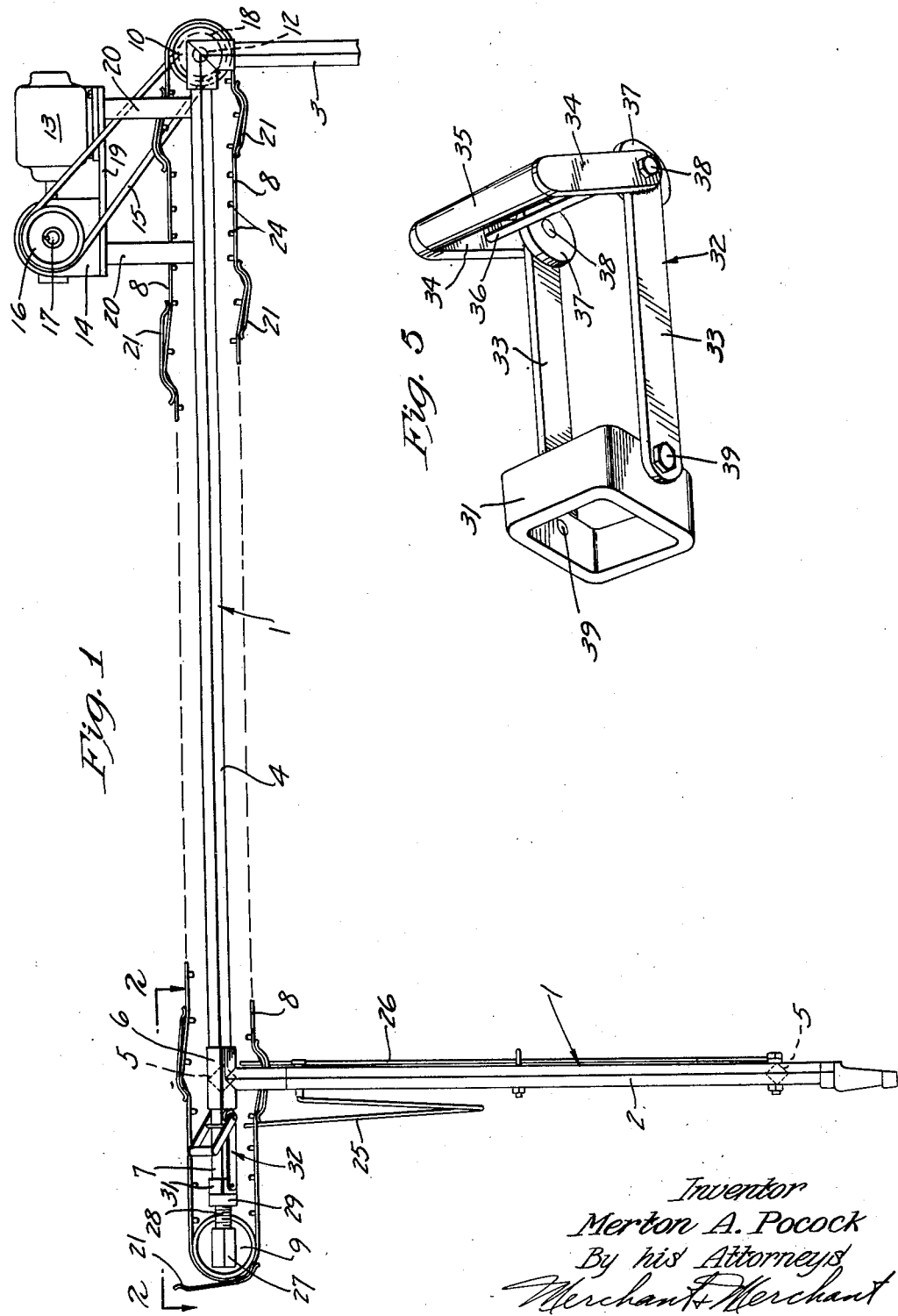

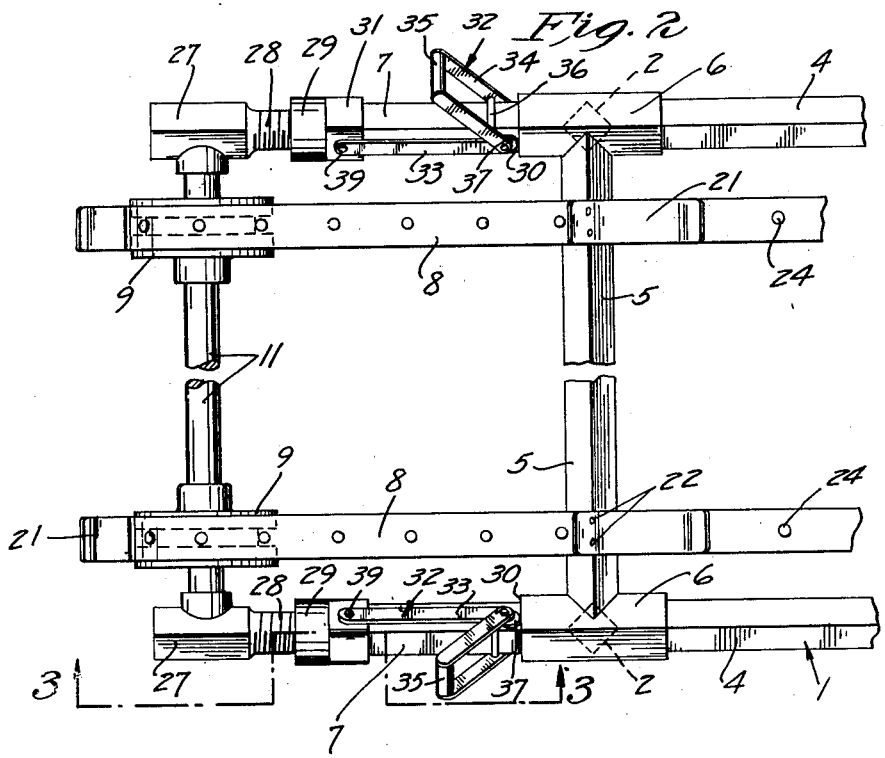
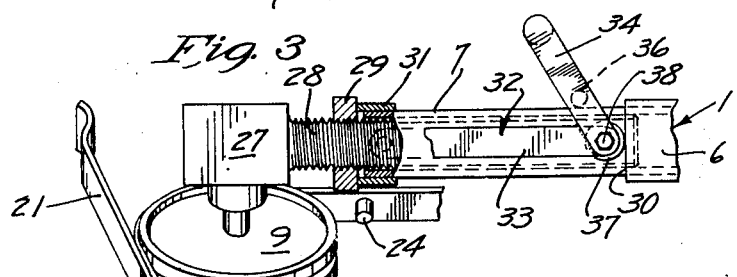
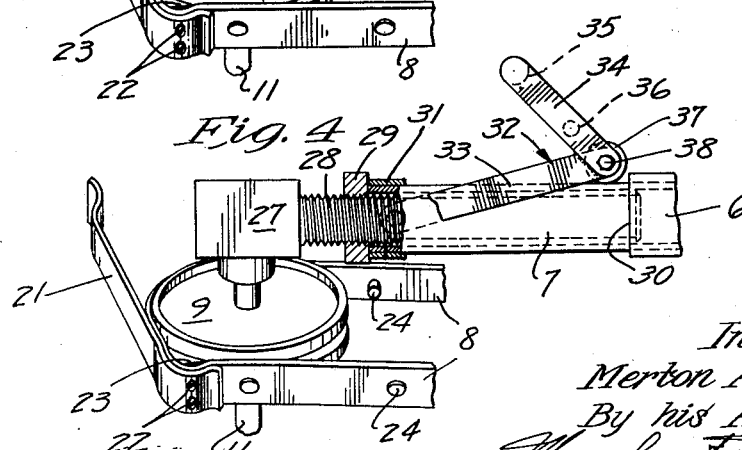

2,539,522

UNITED STATES PATENT OFFICE 2,539,522

BELT TENSION ADJUSTING DEVICE FOR LAUNDRY MACHINES

Merton A. Pocock, Minneapolis, Minn.

Application November 16, 1949, Serial No. 127,670

8 Claims. (Cl. 74—242.14)

My invention relates generally to devices for applying and removing tension on belts running over spaced pulleys and, more specifically, to belt tension-adjusting means in connection with laundry equipment such as flat piece spreaders and the like using a plurality of belts to convey flat pieces such as sheets, spreaders, and the like. The instant invention is in the nature of an improvement on the structure disclosed in United States Letters Patent No. 1,920,715, entitled "Laundry Flat Piece Spreader and Carrier," and has for its primary object the provision of a device for quickly and easily loosening or tightening the conveyor spreader belts of said structure.

Another object of my invention is the provision of a device as set forth, which will permit the belts to be tightened or loosened independently of each other.

Another object of my invention is the provision of a device as set forth, which permits the belts to be loosened and tightened within predetermined limits.

Still another object of my invention is the provision of means for adjusting tension of the belts independently of the above tightening and loosening mechanism.

A still further object of my invention is the provision of a belt-tightening and loosening device as set forth, which is inexpensive to manufacture, efficient in operation, rugged in construction, and durable in use.

Other highly important objects and advantages of my invention will become apparent from the following detailed specification, appended claims, and attached drawings.

Referring to the drawings, wherein like character indicate like parts throughout the several views:

Fig. 1 is a fragmentary view in side elevation of a flat piece spreader incorporating my novel device, some parts being diagrammatically illustrated by the use of broken lines;

Fig. 2 is a fragmentary view in plan of the input end of the spreader of Fig. 1, as seen from the line 2—2 of Fig. 1;

Fig. 3 is an enlarged fragmentary detail as seen substantially from the line 3—3 of Fig. 2 and viewed downwardly at approximately a forty-five degree angle, some parts being broken away and some parts being shown in section;

Fig. 4 is a view corresponding to Fig. 3, but showing a different position of some of the parts; and Fig. 5 is a view in perspective of one of the belt-loosening and tightening devices of my invention.

Referring with greater particularity to the drawings, the numeral 1 indicates, in its entirety, a generally rectangular frame comprising laterally-spaced front legs 2, rear legs 3, one of which is shown, longitudinal cross-sectionally rectangular tubular side rails 4, and upper and lower cross tie members 5. The side rails 4 extend forwardly through a pair of tubular fittings 6 and are welded or otherwise rigidly secured thereto, terminating in forwardly-projecting front end portions 7. The cross tie members 5 connect the front legs 2 at their top and bottom portions, whereby to impart rigidity to the tie frame 1.

The flat piece carrier, which is mounted on the frame 1, includes a pair of horizontal laterally-spaced endless belts 8 arranged to run over front and rear pairs of pulleys 9 and 10 respectively and are closely positioned to the sides of the frame 1 running over and under the upper cross tie rail 5. The front wheels or pulleys 9 are loosely journalled on a transverse shaft 11; and the pulleys 10 are rigidly secured to a shaft 12, shown by dotted lines in Fig. 1. The rear pulleys 10 are driven in a counterclockwise direction with respect to Fig. 1 by a motor 13 through reduction gearing not shown but contained within a housing 14, and an endless belt 15 running over a pulley 16 fast on an output shaft 17 of the gear reduction unit, and a drive pulley 18 shown by dotted lines in Fig. 1 and fast on the shaft 12. The motor 13 and gear housing 14 are suitably mounted on a bracket or mounting plate 19 supported in upwardly-spaced relation to the side rails 4 by supporting legs 20.

A plurality of longitudinally-spaced finger-like clips 21 are secured to the outer face of each belt 8 by screws or the like 22 through aligned holes in the belt 8, the clips 21, and washer-acting plates 23, the screws 22 having threaded engagement with the plates 23. Spaced driving lugs 24 on each of the belts 8 are engaged by driving portions on the rear pulleys 10, as clearly disclosed in the above-identified Patent No. 1,920,715, together with the structure above-described. It is thought that said disclosure precludes any further detailed description in the present case, together with detailed description of the main and auxiliary spreader bars 25 and 26 respectively.

The opposite ends of the shaft 11 are secured to movable mounting elements 27 having threaded portions 28 which are loosely contained in the projected end portions 7 of the side rails 4 for longitudinal sliding movements therein. A pair of nut-acting collars 29 are screw-threaded one each on one of the threaded portions 28 and are adapted to engage the extreme outer ends of the projected portions 7, whereby to limit movements of the mounting elements 27 and the pulley-equipped shaft 11 carried thereby.

The outer ends of each of the fittings 6 provide cam-acting surfaces 30 between which and the outer ends of the projected side rail portions 7 are mounted for free longitudinal movement a pair of slides 31. The slides 31 are generally rectangular, loosely encompassing the projected portion 7 of each side rail 4, and are adapted to abut the nut-acting collars 29 under movements in one direction. A bifurcated swinging arm 32 comprises a pair of spaced arm elements 33 and a pair of angularly-disposed arm portions 34, connected by a handle member 35 and a spacer rod 36. The angularly-disposed portions 34 may, if desired, be integrally formed with the arm elements 33 but preferably and as shown are welded thereto. A pair of cam followers in the nature of rollers 37 are journalled to axially-aligned stub shafts or the like 38 at the point of joinder of the elements 33 and 34. At their ends, the arm elements 33 are pivotally mounted on aligned axes to opposite side portions of one of the slides 31, as indicated at 39. Swinging movements of the arms 32 cause the rollers 37 to engage the cam-acting surfaces 30 of the fittings 6, whereby to cause the slides 31 to move in a direction longitudinally outwardly of the frame 1; and movements of the cam follower rollers 37 away from engagement with the cam-acting surfaces 30 permits longitudinally inward movement of the slides 31 on the rail portions 7.

In practice, it is desirable to maintain the belts 8 in a relatively taut condition when the machine is in operation so that the finger-like clips 21 securely hold the material to be spread between their outer end portions and the overlying portions of the belts 8. However, when the machine is idle for any length of time, it is desirable to relieve tension upon the belts 8 to prevent stretching thereof for the reason that cooperating clips 21 on opposite belts 8 should be relatively even one with respect to another for the most efficient operation of the machine. The desired working tension of the belts 8 is achieved by placing the swinging arms 32 in their positions of Figs. 1, 2, and 3, with the rollers 37 engaging the cooperating cam-acting surfaces 30 and manipulation of the nut-acting collars 29. It will be noted by reference to Fig. 3 that, with the arms 32 thus positioned, the nut-acting collars 29 are moved to an outwardly-spaced relation from the outer end of the side rail portions 7. The spacer rods 36 limit swinging movements of the arms 32 in one direction by engagement with the end portions 7 of the side rails 4. When it is desired to relieve tension upon the belts 8, it is merely necessary to move the arms 32 from their position of Figs. 1, 2, and 3 to the position shown in Fig. 4, whereby the mounting elements 27 and parts carried thereby are permitted to move in a direction to cause engagement of the nut-acting collars 29 with the outer ends of their cooperating side rail portions 7. There is sufficient elasticity in the belts 8 to cause the mounting elements 27 and the wheel-mounting shaft 11 carried thereby to move longitudinally inwardly until the collars 29 engage the outer ends of the side rail portions 7, to which point the greater part of the tension in the belts 8 is relieved. The collars 29 permit independent adjustment of opposite mounting elements 27 to compensate for slight differences which may occur in the lengths of different belts 8.

My invention has been thoroughly tested and found to be completely satisfactory for the accomplishment of the objectives set forth; and, while I have shown a commercial form of my device, it will be understood that the same is capable of modification without departure from the scope and spirit of the invention as defined in the claims.

What I claim is:

1. In a device of the class described, a stationary frame element and a relatively movable element, a shaft carried by said movable element, a pulley mounted on the shaft for rotation with respect to said frame element, and means for moving the movable element with respect to said frame element, said means comprising a cam surface on one of said elements, a slide mounted for reciprocal movements and engageable with the other of said elements, a releasable rigid link pivoted at one end to said slide, and a cam follower on the free end portion of said link engageable with said cam surface to move the movable element in one direction and releasable from engagement therewith to permit movement of the movable element in the opposite direction.

2. In a device of the class described, a relatively stationary frame, a relatively movable mounting element carried by said frame and movable in opposite directions with respect thereto, a shaft mounted at one end in said element, a pulley on said shaft and rotatable with respect to said frame, and means for moving the mounting element with respect to the frame, said means comprising a cam surface on said frame, a slide mounted for reciprocation on said frame and engageable with said mounting element, a releasable rigid link pivoted at one end to said slide, and a cam follower on the free end portion of said link engageable with the cam surface to move the movable element in one direction, and releasable from engagement therewith to permit movement of the movable element in the opposite direction.

3. The structure defined in claim 2 in further combination with adjusting means for moving the mounting means with respect to said frame independently of said first-mentioned means.

4. In a device of the class described, a generally rectangular frame having a pair of laterally-spaced stationary frame elements, a pair of mounting elements carried one each by one of said frame elements and movable with respect thereto, a shaft having its opposite ends mounted in said mounting elements, a pair of spaced pulleys on said shaft and rotatable with respect to said frame, and means for independently moving each of said mounting elements with respect to said frame elements, said means comprising cam-acting surfaces on one pair of elements, a pair of slides mounted for reciprocal movements and engageable one each with one of said other pair of elements, a pair of releasable rigid links pivoted at one end, one each to one of said slides, and cam followers on the free end portions of each of said links engageable with cooperating ones of said cam surfaces to move their respective movable elements in one direction and releasable from engagement therewith to permit movement of their respective movable elements in the opposite direction.

5. The structure defined in claim 4 in which said cam-acting surfaces comprise a portion of said frame elements and in which said slides engage said movable elements.

6. The structure defined in claim 4 in further combination with adjusting means for moving the mounting means with respect to said frame independently of said first-mentioned means.

7. In a device of the class described, a generally rectangular frame having a pair of laterally-spaced parallel tubular frame elements, a pair of mounting elements each being provided with a threaded portion longitudinally slidable one each in one of said tubular frame elements, a stop collar screw-threaded on each of said threaded portions and adapted to engage an adjacent end of its cooperating frame element, a shaft having its opposite ends mounted in said mounting elements, a pair of spaced pulleys on said shaft and rotatable with respect to said frame, and means for independently moving each of said mounting elements with respect to said frame elements, said means comprising cam-acting surfaces on each of said frame elements inwardly-spaced from the outer ends thereof, a pair of tubular slides mounted for reciprocal movements on said frame elements between their outer ends and the cam-acting surfaces thereof and engageable with the collars on said movable elements, a pair of releasable rigid links pivoted at one end each to one of said slides, and cam followers on the free end portions of each of said links engageable with cooperating ones of said cam surfaces to move their respective mounting elements in one direction and releasable from engagement therewith to permit movement of their respective mounting elements in the opposite direction.

8. In a device of the class described, a generally rectangular frame, a pair of axially-aligned pulleys journalled for rotation at one end of said frame, a pair of laterally-spaced stationary tubular frame elements extending longitudinally outwardly of the opposite end of said frame, a pair of mounting elements each being provided with a threaded portion longitudinally slidable one each in one of said tubular frame elements, a stop collar screw-threaded on each of the threaded portions and adapted to engage an adjacent end of its cooperating frame element, a shaft carried by said mounting elements, a pair of pulleys on said shaft, one each of said pulleys being aligned with one of said first-mentioned pulleys, belts running over said aligned pulleys, and means for independently moving each of said mounting elements with respect to said frame whereby to loosen or tighten said belts, said means comprising cam-acting surfaces on each of said frame elements inwardly-spaced from the outer ends thereof, a pair of tubular slides mounted for reciprocal movements on said frame elements between their outer ends and the cam-acting surfaces thereof and engageable with the collars on said movable elements, a pair of releasable rigid links pivoted at one end one each to one of said slides, and cam followers at the free end portions of each of said links engageable with cooperating ones of said cam surfaces to move their respective mounting elements in one direction and releasable from engagement therewith to permit movement of their respective mounting elements in the opposite direction.

MERTON A. POCOCK.

No references cited.